United States Patent [19]
Min

[11] Patent Number: 5,269,069
[45] Date of Patent: Dec. 14, 1993

[54] FINGER RING SIZE MEASURING INSTRUMENT

[76] Inventor: Duck G. Min, 6655 Montaire Pl., La Palma, Calif. 90623

[21] Appl. No.: 884,593

[22] Filed: May 18, 1992

[30] Foreign Application Priority Data

Mar. 11, 1992 [KR] Rep. of Korea .............. 92-3943

[51] Int. Cl.$^5$ .......................... G01B 3/34; G01B 5/00
[52] U.S. Cl. .......................... 33/514.1; 33/555.4
[58] Field of Search ............... 33/511, 512, 514.1, 33/514.2, 555.1, 555.2, 555.4

[56] References Cited

U.S. PATENT DOCUMENTS

| | | | |
|---|---|---|---|
| 251,575 | 12/1881 | Greenwood | 33/555.4 |
| 1,330,330 | 2/1920 | Maynard | 33/514.1 |
| 1,978,682 | 10/1934 | Marvin | 33/555.4 |
| 2,262,664 | 11/1941 | Bresson | 33/555.4 |
| 2,271,725 | 2/1942 | Tunnicliff | 33/514.2 |
| 3,639,995 | 2/1972 | Garoner | 33/762 |
| 3,744,140 | 7/1973 | Kyrk | 33/555.4 |

FOREIGN PATENT DOCUMENTS

| | | | |
|---|---|---|---|
| 0539551 | 7/1959 | Belgium | 33/555.4 |
| 0462548 | 7/1928 | Fed. Rep. of Germany | 33/555.4 |
| 3807326 | 9/1989 | Fed. Rep. of Germany | 33/555.4 |
| 3474917 | 5/1922 | France | 33/555.4 |
| 0680899 | 5/1930 | France | 33/555.4 |
| 0002000 | of 1898 | United Kingdom | 33/514.1 |

Primary Examiner—Thomas B. Will
Attorney, Agent, or Firm—Ladas & Parry

[57] ABSTRACT

The present invention relates to a finger ring size measuring instrument. It comprises a housing, a measuring part installed in the inside of a housing and a strip with one end fixed in the lower wall of the housing and the other end extending outwardly from the housing through an outlet by passing an inlet thereof. The size of a ring is accurately measured by turning the measuring part after a finger is put into the graduated strip and the strip is drawn as one thinks fit.

5 Claims, 3 Drawing Sheets

FINGER RING SIZE MEASURING INSTRUMENT

FIELD OF THE INVENTION

This invention relates to instruments for sizing relatively small objects, such as a human finger.

BACKGROUND OF THE INVENTION

It is the customary practice of the jewelry industry to use a string of measurement rings with varying diameters to measure an individual's finger size. This is commonly done by placing the various measurement rings on an user's finger to be measured one at a time. The ring size is then determined by readings obtained from the inscriptions on the specific measurement rings that fits to the user's liking. The disadvantages of such practice is two fold. First, it is rather time consuming to try on the different measurement rings for sizes. Second, there appears to be a risk that it may be difficult to remove the measurement rings from the user's finger due to swelling or other reasons. Ergo, the present invention is developed to remedy such defects.

SUMMARY OF THE INVENTION

In order to remedy such a defect, the present invention provides an instrument which takes an accurate measurement of a persons finger size by adjusting a measuring mechanism of the present invention after one's finger is properly placed into a strip of present invention where graduations on a strip is capable of selectively engaging with the measuring member of the device to provide a customizing ring sizes for individuals.

BRIEF DESCRIPTION OF THE DRAWINGS

The present invention will be understood more easily by detailed description and drawings of the preferred embodiment.

DETAILED DESCRIPTION OF THE PREFERRED EMBODIMENTS

Figure 1:
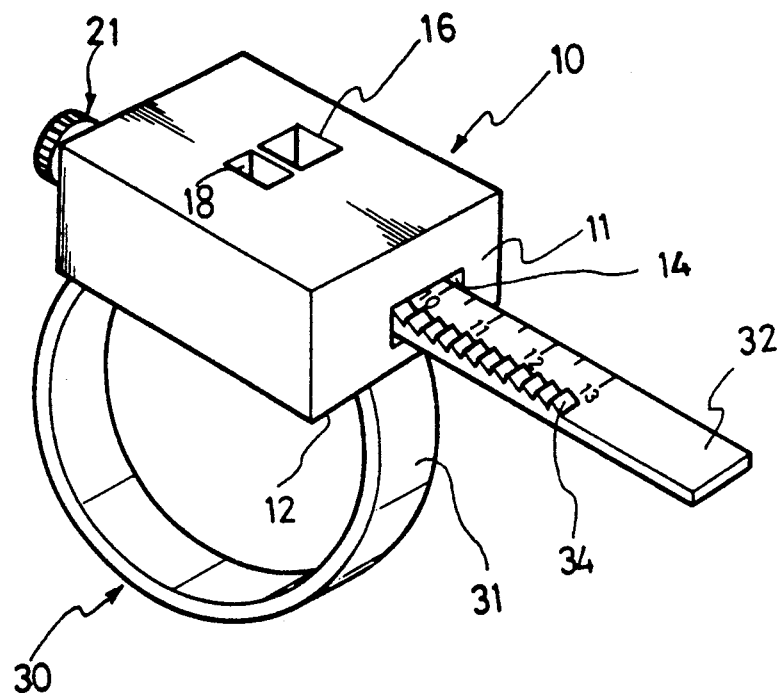
FIG. 1 is a perspective view of the first embodiment of the present invention.
Figure 3:
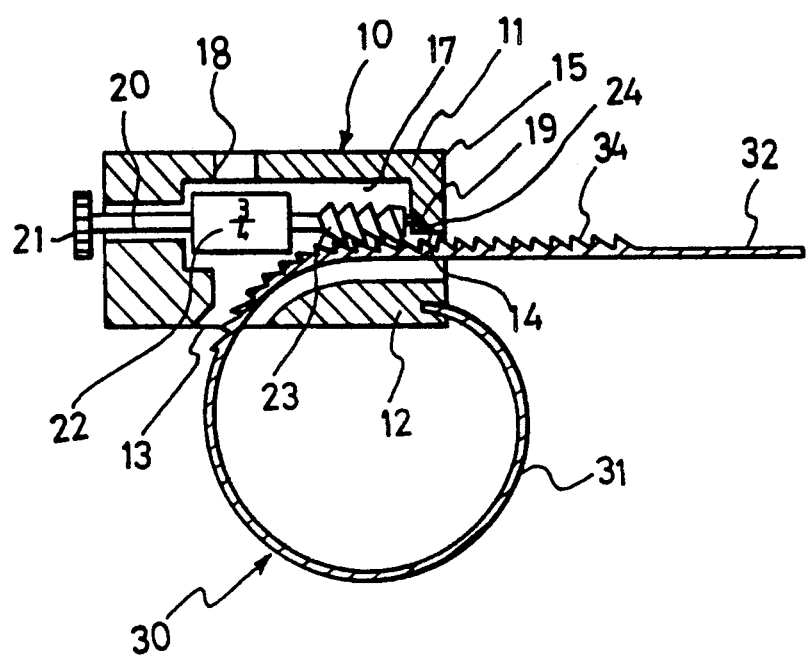
FIG. 3 is a partial cross-sectional view of FIG. 2, generally taken along line A-A.

FIG. 1 and FIG. 3 illustrate a first embodiment of the present invention.

The finger ring size measuring instrument(10) comprises a housing(11), a measuring member(20) installed within the housing(11) and a strip(30) with one end(31) fixed in the lower wall(12) of said housing(11) and another end(32) passing an inlet(13) of said housing(11) and projecting to the outside through an outlet(14) of said housing(11).

In the upper wall(15) of said housing(11) is window(16), having a convex lens installer therein through which graduations of said strip(30) can be seen.

Referring to FIG. 3, the housing (11) has a cavity (17). In the cavity (17) a measuring part(20) is installed horizontally.

Figure 4:
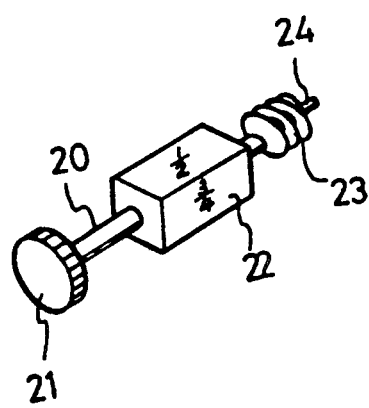
FIG. 4 is a perspective view of a measuring part of the present invention.

Referring to FIG. 3 and 4, the measuring member(20) is bar-shaped. A handle(21) is formed at one end. A scale displaying part(22) is formed in the middle. A spiral gear(23) is formed at the other end. A shaft(24) is projecting to the outside of said spiral gear (23). A seeing-through window(18) is installed in the upside of said housing(11) and the scale displaying part(22) of said measuring member(20) can be seen therethrough. The strip(30) passes the inlet(13) of said housing(11) and goes to the outlet(14) thereof through the cavity (17). There is formed a engaging means perpendicular to a major axis of a strip in the edge on one side of said strip(30). The shaft(24) in the measuring member(20) is inserted into an insert hole(19) formed on the outlet(14) of said housing711) and the measuring member(20) is rotatably fixed in the inside of said housing(11) and an engaging means perpendicular to a major axis(34) of said strip(30) is engaged with the spiral gear(23) of said measuring member(20).

Figure 2:
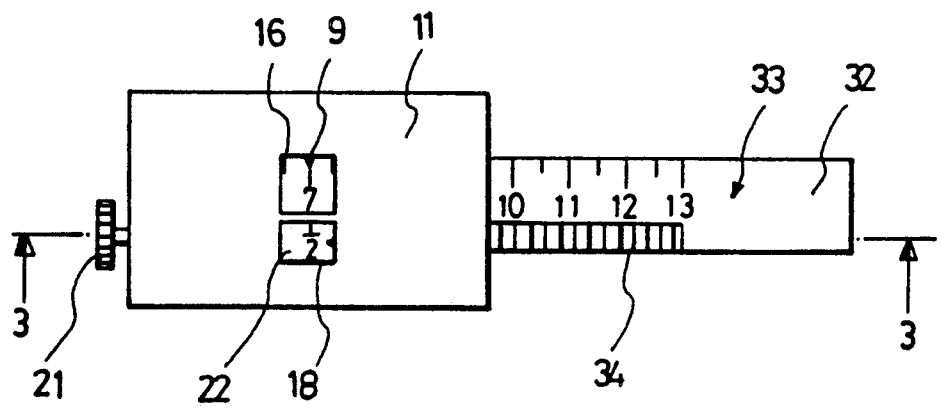
FIG. 2 is a plan view of the first embodiment of the present invention.

In FIGS. 1 and 2, the scale(33) of said strip(30) and the scale displaying part(22) of said measuring member(20) (FIG. 3) are seen together through the convex lens seeing-through window(16) of said housing(11). The indicator(9) in the window(16) indicates 7½ inches.

A measurement of the size of a ring by the present invention is taken as follows:

First of all, a finger is put into a strip(30) of finger ring size measuring instrument(10) illustrated in FIG. 1 and an end part (32) of said strip(30) is drawn to the finger as one thinks fit. Next, the strip(30) is tightened so as to exactly fit to the finger by turing the handle(21). Then, as illustrated in FIG. 2, the scale(33) of said strip(30) and the scale displaying part(22) of said measuring member(20) can be seen through the seeing-through windows(16) (18) of said housing(11).

For example, the size of a ring measured by the instrument shown in FIG. 2 would correspond to size 7½.

After the size of a ring is measured, an engaging means perpendicular to a major axis(34) of said strip(30) is separated from the spiral gear(23) of measuring member(20) by pulling the end part(32) of said strip(30) so as to adhere closely to the lower wall(12) housing(11) as illustrated in FIG. 3 and, when a finger put into the strip(30) is pulled, the strip(30) moves to the inlet(13) from the outlet(14) of housing(11) and the finger can be drawn out of the strip(30), as illustrated in FIG. 3. Here, the strip(30) is so stiff as to engage their engaging means perpendicular to a major axis (34) with the spiral gear (23) of measuring member (20) by jumping up to some extent from the lower wall of said housing(11). It will do if the strip(30) is plastic.

Figure 5:
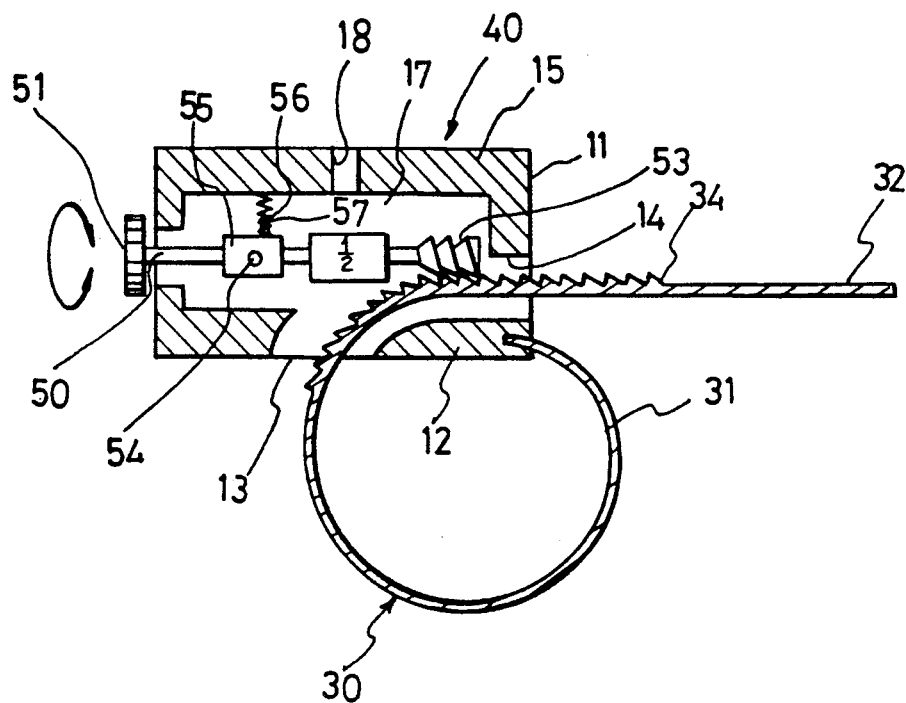
FIG. 5 is a cross-sectional view of the second embodiment of the present invention.

FIG. 5 illustrates a second embodiment of the present invention by a cross-sectional view.

The second ring size measuring instrument(40) is similar to the first embodiment with the exception of a difference in the supporting structure of measuring member (50) for the housing(11). Accordingly, the housing(11) and the strip(30) are indicated by the same mark as in the first embodiment.

Figure 6:
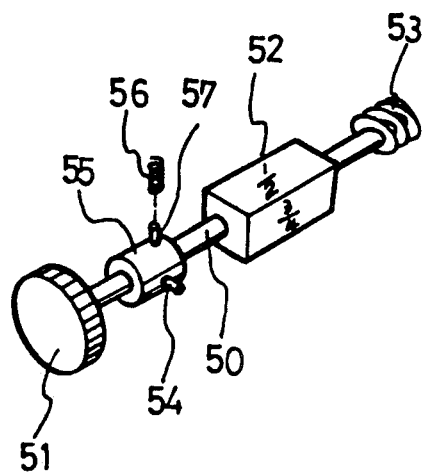
FIG. 6 is a exploded perspective view of a supporting part supporting a measuring member of the second embodiment of the present invention.

The measuring member (50) in the second embodiment is illustrated in FIG. 6 by a perspective view. The measuring member (50) is bar-shaped. A handle(51) is formed at one end. A scale displaying part(52) is formed in the middle. Spiral gear (53) is formed at the other end.

Moreover, a sleeve(55) with a pivot shaft(54) projecting to both sides is installed between the handle(51) and scale displaying part(52) and a compression spring(56) fixable projection(57) is formed in the upper edge of said sleeve(55).

The operation of a finger ring size measuring instrument according to the second embodiment will now be described by referring to FIG. 5.

The measuring member (50) is installed across the cavity(17) of said housing(11). The sleeve(55) is fixed within the cavity(17) of said housing(11) so as to turn with the pivot shaft(54) as the center.

The compression spring(56) is installed between the upper wall(15) of said housing(11) and the projection(57) of said sleeve(55).

Accordingly, when the handle(51) of said measuring member(50) is pushed downward after the size of a ring is measured in the same way as in the first embodiment by puting a finger into the strip(30), the measuring member (50) turns with the pivot shaft(54) of said sleeve(55) as the center and the spiral gear(53) of measuring member (50) is separated from an engaging means perpendicular to a major axis(34) of said strip(30) by rising upward. When the finger put into the strip(30) is drawn, it can be pulled out of the strip(30).

The present invention constituted in such a manner as described hereinabove has the advantage of taking an accurate measurement of ring size if the handle of measuring part is turned by putting a finger into the strip(30).

It is understood that the same is not limited thereto but is susceptible of numerous changes and modifications as known to a person skilled in the art without departing from the spirit and scope of the invention as set forth in the appended claims.

What is claimed is;

1. A finger ring size measuring instrument, comprising:
    (a) a housing having a cavity therein, and at least one window into said cavity, said cavity having an inlet and an outlet disposed through said housing;
    (b) a measuring member disposed in said cavity in said housing having a handle at one end of said measuring member said handle being disposed exteriorly of said housing, measuring indicia inscribed on surfaces of a scale displaying part of said measuring member disposed for viewing through said least one window of said housing and said measuring member further having a gear disposed on said measuring member within said cavity of said housing; and
    (c) an elongated strip having a graduated scale, said strip being fixed to said housing and disposed between said inlet and said outlet and through said cavity in said housing so as to form a loop outside of said housing, the graduated scale being disposed for viewing through said at least one window said strip including engaging means in contact with said gear of said measuring member.

2. The finger ring size measuring instrument in claim 1 wherein said scale displaying part of said measuring member rotates about an axis of said measuring member to display at least one of said surfaces of said scale displaying part bearing said measuring indicia for viewing through said at least one window of said housing.

3. A device for measuring the size of an object comprising:
    a housing having a cavity therein, an inlet into said cavity, an outlet from said cavity, and at least one window into said cavity;
    a measuring member disposed in said housing and bearing measuring indicia thereon disposed for viewing through said at least one window of said housing and said measuring member further comprising first engaging means;
    an elongated strip having a graduated scale, said enlongated strip being fixed to said housing and also disposed in said cavity between said inlet and said outlet of said housing so as to form a loop outside of said housing, the graduated scale being disposed for viewing through said at least one window, said strip including second engaging means normally in contact with said first engaging means of said measuring member and is selectively disengageable from said first engaging means by the application of an external force on said strip; and
    a handle disposed at one end of said measuring member extending to the exterior of said housing.

4. The device of claim 3 wherein said measuring member further comprising:
    a sleeve on said measuring member;
    at least one pivot shaft projection extending outwardly from said sleeve;
    a fixable projection located on said sleeve;
    a compression spring telescoping said fixable projection; and wherein said fixable projection rotates with rotation of said handle of said measuring member.

5. The device of claim 3 wherein said inlet, outlet and cavity form tunnel space which is bigger than said strip to provide space for release of said second engaging means perpendicular to a major axis of said strip from said first engaging means of said measuring member.

* * * * *